United States Patent
Manning

[15] 3,671,526
[45] June 20, 1972

[54] THIAZOLOPYRIMIDINES

[72] Inventor: Robert E. Manning, Mountain Lakes, N.J.

[73] Assignee: Sandoz-Wander, Inc., Hanover, N.J.

[22] Filed: May 25, 1970

[21] Appl. No.: 40,367

Related U.S. Application Data

[63] Continuation-in-part of Ser. No. 827,996, May 26, 1969, abandoned, which is a continuation-in-part of Ser. No. 741,856, July 2, 1968, abandoned, which is a continuation-in-part of Ser. No. 680,307, Nov. 3, 1967, abandoned.

[52] U.S. Cl. .........................260/251 A, 260/251 R, 424/251
[51] Int. Cl. ...........................................................C07d 51/46
[58] Field of Search .....................................260/251 A, 69 E

[56] References Cited

OTHER PUBLICATIONS

C. A. 71, 81401x (1969)
Chadha et al., Can. J. Chem. 1969, 47(15), 2843–4.

*Primary Examiner*—Henry R. Jiles
*Assistant Examiner*—R. V. Rush
*Attorney*—Gerald D. Sharkin, Frederick H. Weinfeldt, Robert S. Honor, Walter F. Jewell and Richard E. Vila

[57] ABSTRACT

Substituted thiazolopyrimidines, e.g., 3-p-chlorophenyl-6,7-dihydro-5H-thiazolo[3,2-a]pyrimidine hydrochloride, are prepared from phenacyl halides and propylene thiourea and are useful as CNS stimulants and analgesics.

18 Claims, No Drawings

THIAZOLOPYRIMIDINES

This application is a continuation-in-part of application Ser. No. 827,996, filed May 26, 1969, now abandoned which in turn is a continuation-in-part of application Ser. No. 741,856, filed July 2, 1968, now abandoned, which in turn is a continuation-in-part of application Ser. No. 680,307, filed Nov. 3, 1967, now abandoned.

This invention relates to novel heterocyclic compounds. More particularly, this invention pertains to novel 3-phenyl and 3-substituted phenyl 6,7-dihydro-5H-thiazolo[3,2-a]pyrimidines and to acid addition salts thereof. This invention also pertains to methods for preparing these compounds, to intermediates therefor, and to methods for the preparation of the intermediates.

The thiazolopyrimidines of the present invention may be represented by the following structural formula

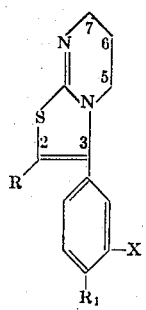

(I)

where
R is hydrogen or phenyl;
$R_1$ is hydrogen, chloro, fluoro, phenyl or lower alkoxy, i.e., lower alkoxy having 1 to 4 carbon atoms, e.g., methoxy, ethoxy and isopropoxy, and
X is hydrogen, chloro or trifluoromethyl, provided that when X is chloro, $R_1$ is chloro, and when X is trifluoromethyl, $R_1$ is H,
or pharmaceutically acceptable acid addition salts thereof.

The process for preparing the compounds of formula (I) may be represented as follows:

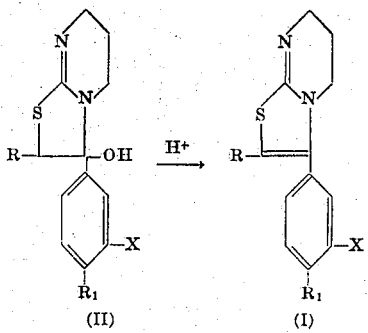

where R, $R_1$, X and the proviso are as set out above.

The pyrimidines of formula (I) are prepared from the compounds of formula (II) or an acid addition salt thereof by treatment with a strong mineral acid at a temperature from about room temperature to about 100° C, preferably about 50° to 70° C. The mineral acid may be in dilute or concentrated form and such acids as hydrochloric acid, sulfuric acid, phosphoric acid and the like may be utilized. The reaction may be performed in solvent but use of solvent and the particular solvent utilized is not considered critical. As illustrative of the solvents which may be used there may be mentioned lower alkanols such as ethanol, isopropanol and the like, acetone, tetrahydrofuran, and similar inert solvents.

The compounds of formula (II) in acid addition salt form (IIa) may be prepared in accordance with the following reaction scheme:

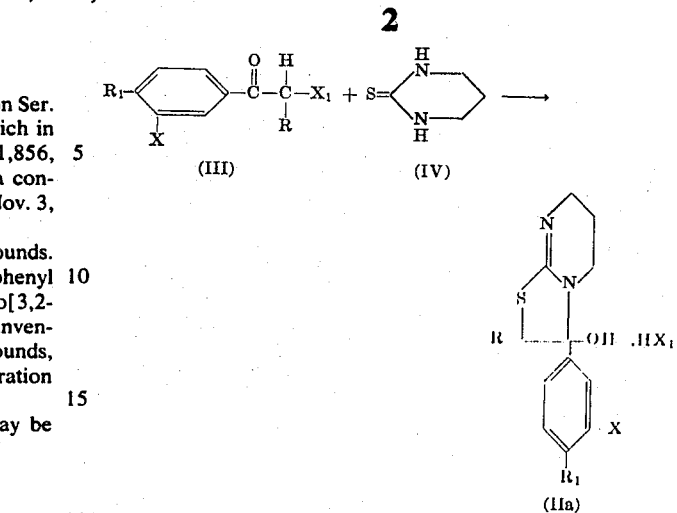

where R, $R_1$, X and the proviso are as set out above and $X_1$ represents bromine or chlorine.

Accordingly, the compounds of formula (IIa) above are prepared by treating a phenacyl halide (III), such as the bromide or chloride, e.g., p-chloro phenacyl bromide, with propylenethiourea (IV) in solvent at a temperature of about 0° to 60° C. Preferred temperatures are about 10° to 35° C. The solvents which may be used include acetone, lower alkanols such as ethanol, tetrahydrofuran and the like, although the particular solvent used and the temperature are not critical.

As indicated above, the compounds of formulas (I) and (II) above may be recovered as their acid addition salts. When it is desired to convert such salts to the corresponding free bases, conventional techniques may be utilized, e.g., dissolution of the salt in water and precipitation using a base such as sodium hydroxide.

The compounds of formula (II) may also be illustrated by their tautomeric equivalents such as represented by the following structural formula

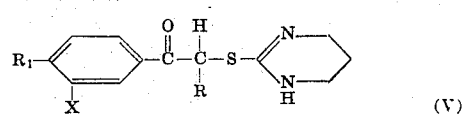

(V)

where R, $R_1$, X and the proviso are as set out above.

In order to simplify this description, however, formula (II) only will be used. It should be nevertheless understood that the compounds of formula (V) may be represented as well as the compounds of formula (II) and both tautomeric forms are within the concept of the present invention.

Certain of the phenacyl halides (III) above are known and are prepared by methods disclosed in the literature. Those not specifically disclosed are prepared from known materials in an analogous manner.

The compounds of formulas (I) and (II) are useful because they possess pharmacological activity in animals. More particularly, compounds (I) and (II) with the exception of the compounds in which both $R_1$ and X are hydrogen are useful as CNS stimulants and especially as anti-depressants, as indicated by their activity in mice tested according to the 30-word adjective check sheet system basically described by S. Irwin (Gordon Research Conference, Medicinal Chemistry, 1959) and Chen (Symposium on Sedative and Hypnotic Drugs, Williams and Wilkins, 1954).

The compounds of formulas (I) and (II) are also useful as analgesics as indicated by their activity in mice tested essentially by the "Writhing Method" of Seigmund et al. (Proc. Soc. Exp. Biol., 95 : 729, 1957) as modified by Okun et al. (J. Pharmacol. & Exper. Therap., 139 : 107, 1963).

Furthermore, the compounds of formulas (I) and (II) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

When utilized for either of the above uses, the thiazolopyrimidines may be combined with a pharmaceutically acceptable carrier or adjuvant and administered orally or parenterally. For these uses, the dosage will vary depending upon the mode of administration utilized and the particular compound employed. However, in general, satisfactory results are obtained for both the anti-depressant use and the analgesic use when the compounds are administered at a daily dosage of from about 0.5 milligrams to 50 milligrams per kilogram of animal body weight. This daily dosage is preferably given in divided doses, e.g., 2 to 4 times a day, or in sustained release form. For most large mammals, the total daily dosage is from about 15 to 300 milligrams, and dosage forms suitable for internal administration comprise from about 4 milligrams to about 150 milligrams of the compound in admixture with a solid or liquid pharmaceutical carrier or diluent.

A representative formulation suitable for oral administration is a tablet prepared by standard tabletting techniques which contains the following:

| Ingredient | Parts by Weight |
| --- | --- |
| 3-p-chlorophenyl-6,7-dihydro-5H-thiazolo[3,2-a]pyrimidine hydrochloride | 10 |
| tragacanth | 2 |
| lactose | 79.5 |
| corn starch | 5 |
| talcum | 3 |
| magnesium stearate | 0.5 |

EXAMPLE 1
3-p-chlorophenyl-6,7-dihydro-5H-thiazolo[3,2-a]pyrimidine hydrochloride

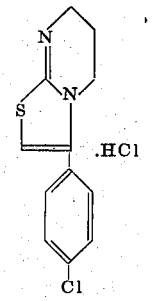

Step 1. 3-p-chlorophenyl-3-hydroxy-2,3,6,7-tetrahydro-5H-thiazolo[3,2-a]pyrimidine hydrobromide A solution of p-chlorophenacyl bromide (12 g) in 70 ml acetone is added with stirring in one portion to a solution of propylenethiourea (6 g) in acetone (400 ml) at room temperature. After stirring for 1 and 3/4 hours, 16.4 g of the resultant product, 3p-chlorophenyl-3-hydroxy-2,3,6,7-tetrahydro-5H-thiazolo[3,2-a]pyrimidine hydrobromide is collected by filtration; m.p. 210° C.

The free base is prepared by suspending the salt in water, adding sodium carbonate, and collecting the resulting solid.

Step 2. 3-p-chlorophenyl-6,7-dihydro-5H-thiazolo[3,2-a]pyrimidine hydrochloride

A mixture of 3-p-chlorophenyl-3-hydroxy-2,3,6,7-tetrahydro-5H-thiazolo[3,2-a]pyrimidine, methanol (200 ml) and concentrated HCl (40 ml) is refluxed for 3 hours and then evaporated in vacuo. The resultant syrup is crystallized from ether to give 18 g of solid which is then crystallized from methanol-ether (1:3) to give 12.2 g of 3-p-chlorophenyl-6,7-dihydro-5H-thiazolo[3,2-a]pyrimidine hydrochloride; m.p. 269° to 271° C.

EXAMPLE 2
3-phenyl-6,7-dihydro-5H-thiazolo[3,2-a]pyrimidine hydrochloride

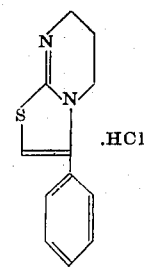

Step 1. 3-phenyl-3-hydroxy-2,3,6,7-tetrahydro-5H-thiazolo[3,2-a]pyrimidine hydrobromide A solution of phenacyl bromide (20 g) in acetone (150 ml) is added in one portion with stirring to a solution of propylenethiourea (11.2 g) in acetone (800 ml). After stirring for 1¾ hours, 30.5 g of the resultant product, 3-phenyl-3-hydroxy-2,3,6,7-tetrahydro-5H-thiazolo[3,2-a]pyrimidine hydrobromide is collected by filtration; m.p. 197° C.

Step 2. 3-phenyl-6,7-dihydro-5H-thiazolo[3,2-a]pyrimidine hydrochloride

A mixture of 18 g of 3-phenyl-3-hydroxy-2,3,6,7-tetrahydro-5H-thiazolo[3,2-a]pyrimidine (18 g) methanol (200 ml) and concentrated HCl (40 ml) is refluxed for 3 hours. The resultant solution is evaporated in vacuo. The resultant syrup is crystallized from acetone to provide 11.8 g of 3-phenyl-6,7-dihydro-5H-thiazolo[3,2-a]pyrimidine hydrochloride; m.p. 222° to 224° C.

EXAMPLE 3
2,3-diphenyl-6,7-dihydro-5H-tiazolo[3,2-a]pyrimidine hydrochloride

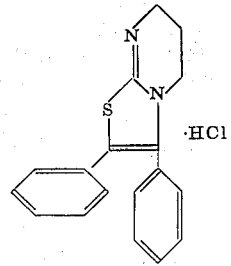

Step 1. 2,3-diphenyl-3-hydroxy-2,3,6,7-tetrahydro-5H-thiazolo[3,2-a]pyrimidine hydrochloride A solution of desylchloride (23 g) in acetone (150 ml) is added in one portion with stirring to a solution of propylenethiourea (11.6 g) in acetone (800 ml). After stirring for 2½ hours, the resultant solid is collected by filtration to give 27.0 g of 2,3-diphenyl-3-hydroxy-2,3,6,7-tetrahydro-5H-thiazolo[3,2-a]pyrimidine hydrochloride; m.p. 283° C.

Step 2. 2,3-diphenyl-6,7-dihydro-5H-thiazolo[3,2-a]pyrimidine hydrochloride

A mixture of 2,3-diphenyl-3-hydroxy-2,3,6,7-tetrahydro-5H-thiazolo[3,2-a]pyrimidine hydrochloride (12 g), methanol (120 ml) and concentrated HCl (24 ml) is refluxed for 2 hours. The solution is evaporated in vacuo and the resultant syrup crystallized from acetone to give 2,3-diphenyl-6,7-dihydro-5H-thiazolo[3,2-a]pyrimidine hydrochloride; 9.2 g, m.p. 293° C.

EXAMPLE 4
3-p-methoxyphenyl-6,7-dihydro-5H-thiazolo[3,2-a]pyrimidine hydrochloride

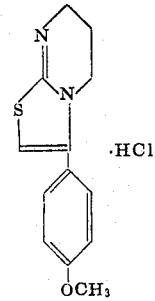

Step 1. 3-hydroxy-3-p-methoxyphenyl-2,3,6,7-tetrahydro-5H-thiazolo[3,2-a]pyrimidine hydrobromide A solution of p-methoxyphenacyl bromide (11.6 g) in acetone (80 ml) is added with stirring at room temperature to a solution of propylenethiourea (5.8 g) in acetone (500 ml). After stirring for 1½ hours, the resultant solid is collected by filtration to give 3-hydroxy-3-methoxyphenyl-2,3,6,7-tetrahydro-5H-thiazolo[3,2-a]pyrimidine hydrobromide (13 g); m.p. 203° to 205° C.

Step 2. 3-p-methoxyphenyl-6,7-dihydro-5H-thiazolo[3,2-a]pyrimidine hydrochloride A mixture of 3-hydroxy-3-p-methoxyphenyl-2,3,6,7-tetrahydro-5H-thiazolo[3,2-a]pyrimidine (5 g), methanol (200 ml) and concentrated HCl (40 ml) is heated under reflux for 3 hours. The resultant reaction mixture is evaporated in vacuo and the residue is crystallized from acetone to give the crude product which is then recrystallized from methanol-ether (1:3) to afford 3.8 g of substantially pure 3-p-methoxyphenyl-6,7-dihydro-5H-thiazolo[3,2-a]pyrimidine hydrochloride; m.p. 257° to 258° C.

EXAMPLE 5

3-p-fluorophenyl-6,7-dihydro-5H-thiazolo[3,2-a]pyrimidine hydrochloride

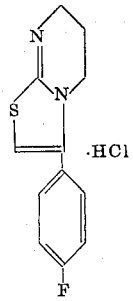

Step 1. 3-p-fluorophenyl-3-hydroxy-2,3,6,7-tetrahydro-5H-thiazolo[3,2-a]pyrimidine hydrobromide A solution of p-fluorophenacyl bromide (11 g) in acetone (80 ml) is added with stirring at room temperature to a solution of propylenethiourea (5.8 g) in acetone (500 ml). After stirring for 1½ hours, the resultant solid is collected by filtration to give 14.9 g of 3-p-fluorophenyl-3-hydroxy-2,3,6,7-tetrahydro-5H-thiazolo[3,2-a]pyrimidine hydrobromide; m.p. 294° to 296° C.

Step 2. 3-p-fluorophenyl-6,7-dihydro-5H-thiazolo[3,2-a]pyrimidine hydrochloride

A mixture of 3-p-fluorophenyl-3-hydroxy-2,3,6,7-tetrahydro-5H-thiazolo[3,2-a]pyrimidine (5 g), methanol (200 ml) and concentrated HCl (40 ml) is heated under reflux for 16 hours. The resultant reaction mixture is evaporated in vacuo and the residue is crystallized from ether to give crude product. This product is recrystallized from methanol-ether (1:3) to give 3-p-fluorophenyl-6,7-dihydro-5H-thiazolo[3,2-a]pyrimidine hydrochloride; m.p. 242°-243° C. (with decomposition).

EXAMPLE 6

3-p-biphenylyl-6,7-dihydro-5H-thiazolo[3,2-a]pyrimidine hydrochloride

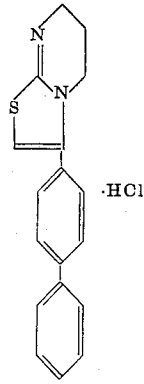

Step 1. 3-p-biphenylyl-3-hydroxy-2,3,6,7-tetrahydro-5H-thiazolo[3,2-a]pyrimidine hydrobromide A solution of p-phenyl phenacyl bromide (6.9 g) in acetone (50 ml) is added with stirring at room temperature to a solution of propylenethiourea (2.9 g) in acetone (200 ml). After stirring for 5 hours, the resultant solid is collected by filtration to give 9.4 g of 3-p-biphenylyl-3-hydroxy-2,3,6,7-tetrahydro-5H-thiazolo[3,2-a]pyrimidine hydrobromide; mp 338° – 339° C with decomposition.

Step 2. 3-p-biphenylyl-6,7-dihydro-5H-thiazolo[3,2-a]pyrimidine hydrochloride

A mixture of 3-p-biphenylyl-3-hydroxy-2,3,6,7-tetrahydro-5H-thiazolo[3,2-a]pyrimidine (4.0 g), methanol (200 ml) and concentrated hydrochloric acid (40 ml) is heated under reflux for 24 hours. The resulting reaction mixture is evaporated in vacuo and the residue is crystallized from ether to give crude product which is recrystallized from methanol-ether (1:3) to give 3-p-biphenylyl-6,7-dihydro-5H-thiazolo[3,2-a]pyrimidine hydrochloride; m.p. 299°–300° C with decomposition.

EXAMPLE 7

3-α,α,α-trifluoro-m-tolyl-6,7-dihydro-5H-thiazolo[3,2-a]pyrimidine hydrochloride

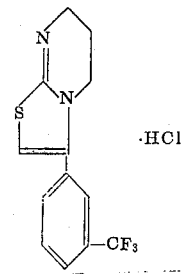

Step 1. 3-hydroxy-3-α,α,α-trifluoro-m-tolyl-2,3,6,7-tetrahydro-5H-thiazolo[3,2-a]pyrimidine hydrobromide A solution of m-trifluoromethyl phenacyl bromide (7.1 g) in acetone (50 ml) is added with stirring at room temperature to a solution of propylenethiourea (3.0 g) in acetone (200 ml). After stirring for 2 hours, the resultant solid is collected by filtration to give 9.4 g. of 3-hydroxy-3-α,α,α-trifluoro-m-tolyl-2,3,6,7-tetrahydro-5H-thiazolo[3,2-a]pyrimidine hydrobromide; m.p. 191°–192° C with decomposition.

Step 2. 3-α,α,α-trifluoro-m-tolyl-6,7-dihydro-5H-thiazolo[3,2-a]pyrimidine hydrochloride A mixture of 3-hydroxy-3-α,α,α-trifluoro-m-tolyl-2,3,6,7-tetrahydro-5H-thiazolo[3,2-a]pyrimidine (5.0 g), methanol (125 ml) and concentrated hydrochloric acid (30 ml) is heated under reflux for 24 hours. The resulting reaction mixture is evaporated in vacuo and the residue is crystallized from acetone to give crude product which is recrystallized from methanol-ether (1:3) to give 3-α,α,α-trifluoro-m-tolyl-6,7-dihydro-5H-thiazolo[3,2-a]pyrimidine hydrochloride; m.p. 208°–209° C with decomposition.

EXAMPLE 8

3-(3,4-dichlorophenyl)-6,7-dihydro-5H-thiazolo[3,2-a]pyrimidine hydrochloride

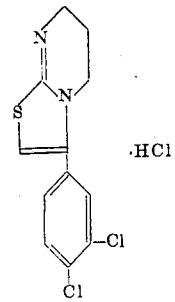

Step 1. 3-(3,4-dichlorophenyl)-3-hydroxy-2,3,6,7-tetrahydro-5H-thiazolo[3,2-a]pyrimidine hydrobromide A solution of 3,4-dichlorophenacyl bromide (13.3 g) in acetone (80 ml) is added with stirring at room temperature to a solution of propylenethiourea (5.8 g) in acetone (500 ml). After stirring for 1½ hours, the resulting solid is collected by filtration to give 3-(3,4-dichlorophenyl)-3-hydroxy-2,3,6,7-tetrahydro-5H-thiazolo[3,2-a]pyrimidine hydrobromide. This compound melts at 200° C and resolidifies thereafter remelting at 260°–270° C.

This intermediate product is converted to the free base form by addition to water, treating with sodium carbonate and collecting the resulting solid.

Step 2. 3-(3,4-dichlorophenyl)-6,7-dihydro-5H-thiazolo[3,2-a]pyrimidine hydrochloride A mixture of 3-(3,4-dichlorophenyl)-3-hydroxy-2,3,6,7-tetrahydro-5H-thiazolo[3,2-a]pyrimidine (7.5 g), methanol (200 ml) and concentrated hydrochloric acid (40 ml) is heated under reflux for 3 hours. The resultant reaction mixture is evaporated in vacuo and the residue is crystallized from ether to give crude product. This product is recrystallized from methanol-ether (1:4) to give 3-(3,4-dichlorophenyl)-6,7-dihydro-5H-thiazolo[3,2-a]pyrimidine hydrochloride; m.p. 268°–270° C (with decomposition).

The corresponding free base is prepared by adding the salt to water, treating with sodium carbonate and collecting the resulting solid.

What is claimed is:

1. A compound of the formula

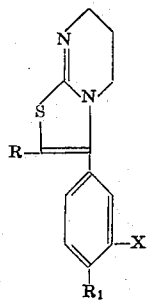

where
R is hydrogen or phenyl;
R₁ is hydrogen, chloro, fluoro, phenyl or lower alkoxy; and
X is hydrogen, trifluoromethyl or chloro, provided that when X is chloro, R₁ is chloro, and when X is trifluoromethyl, R₁ is H;
or a pharmaceutically acceptable acid addition salt thereof.

2. The compound of claim 1 which is 3-p-chlorophenyl-6,7-dihydro-5H-thiazolo[3,2-a]pyrimidine.

3. The compound of claim 1 which is 3-phenyl-6,7-dihydro-5H-thiazolo[3,2-a]pyrimidine.

4. The compound of claim 1 which is 2,3-diphenyl-6,7-dihydro-5H-thiazolo[3,2-a]pyrimidine.

5. The compound of claim 1 which is 3-(3,4-dichlorophenyl)-6,7-dihydro-5H-thiazolo[3,2-a]pyrimidine.

6. The compound of claim 1 which is 3-p-methoxyphenyl-6,7-dihydro-5H-thiazolo[3,2-a]pyrimidine.

7. The compound of claim 1 which is 3-p-fluorophenyl-6,7-dihydro-5H-thiazolo[3,2-a]pyrimidine.

8. The compound of claim 1 which is 3-p-biphenylyl-6,7-dihydro-5H-thiazolo[3,2-a]pyrimidine.

9. The compound of claim 1 which is 3-α,α, α-trifluoro-m-tolyl-6,7-dihydro-5H-thiazolo[3,2-a]pyrimidine.

10. A compound of the formula

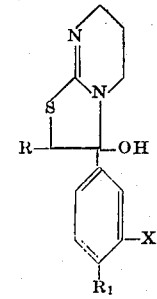

where
R is hydrogen or phenyl;
R₁ is hydrogen, chloro, fluoro, phenyl or lower alkoxy; and
X is hydrogen, trifluoromethyl or halo, provided that when X is chloro, R₁ is chloro, and when X is trifluoromethyl, R₁ is H,
or an acid addition salt thereof.

11. The compound of claim 10 which is 3-p-chlorophenyl-3-hydroxy-2,3,6,7-tetrahydro-5H-thiazolo[3,2-a]pyrimidine.

12. The compound of claim 10 which is 3-phenyl-3-hydroxy-2,3,6,7-tetrahydro-5H-thiazolo[3,2-a]pyrimidine.

13. The compound of claim 10 which is 2,3-diphenyl-3-hydroxy-2,3,6,7-tetrahydro-5H-thiazolo[3,2-a]pyrimidine.

14. The compound of claim 10 which is 3-(3,4-dichlorophenyl)-3-hydroxy-2,3,6,7-tetrahydro-5H-thiazolo[3,2-a]pyrimidine.

15. The compound of claim 10 which is 3-hydroxy-3-p-methoxyphenyl-2,3,6,7-tetrahydro-5H-thiazolo[3,2-a]pyrimidine.

16. The compound of claim 10 which is 3-p-fluorophenyl-3-hydroxy-2,3,6,7-tetrahydro-5H-thiazolo[3,2-a]pyrimidine.

17. The compound of claim 10 which is 3-p-biphenylyl-3-hydroxy-2,3,6,7-tetrahydro-5H-thiazolo[3,2-a]pyrimidine.

18. The compound of claim 10 which is 3-hydroxy-3-α,α, α-trifluoro-m-tolyl-2,3,6,7-tetrahydro-5H-thiazolo[3,2-a]pyrimidine.

* * * * *